United States Patent
Handshaw et al.

(10) Patent No.: US 8,789,760 B2
(45) Date of Patent: Jul. 29, 2014

(54) METHOD AND APPARATUS FOR POWERING BARCODE READERS

(75) Inventors: Darran M. Handshaw, Sound Beach, NY (US); Alan N. Mears, Lake Grove, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 224 days.

(21) Appl. No.: 12/914,016

(22) Filed: Oct. 28, 2010

(65) Prior Publication Data

US 2012/0104101 A1  May 3, 2012

(51) Int. Cl.
*G06K 7/10* (2006.01)
(52) U.S. Cl.
USPC ............. 235/462.41; 235/462.42; 235/455; 235/462.11; 235/462.35; 235/454
(58) Field of Classification Search
USPC ............... 235/462.41, 462.42, 455, 462.11, 235/462.01, 462.35, 454
See application file for complete search history.

(56) References Cited

U.S. PATENT DOCUMENTS

| | | | | |
|---|---|---|---|---|
| 6,092,728 | A * | 7/2000 | Li et al. | 235/454 |
| 7,144,255 | B2 * | 12/2006 | Seymour | 439/49 |
| 2005/0258956 | A1 * | 11/2005 | Neuwirth | 340/539.13 |
| 2007/0013340 | A1 * | 1/2007 | Mattichak | 320/101 |
| 2007/0291126 | A1 * | 12/2007 | Morishita et al. | 348/207.99 |
| 2009/0084847 | A1 * | 4/2009 | He et al. | 235/455 |
| 2010/0211132 | A1 * | 8/2010 | Nimmagadda et al. | 607/60 |
| 2010/0326442 | A1 * | 12/2010 | Hamilton et al. | 128/204.21 |
| 2011/0080263 | A1 * | 4/2011 | Theile et al. | 340/10.1 |
| 2012/0029994 | A1 * | 2/2012 | Barkan et al. | 705/14.25 |
| 2012/0049784 | A1 * | 3/2012 | Klicpera | 320/103 |

OTHER PUBLICATIONS

UL 94, "Standard for Tests for Flammability of Plastic Materials for Parts in Devices and Appliances," Fifth Edition, published Oct. 29, 1996 (ISBN 0-7629-0082-2) pp. 14-17.

* cited by examiner

*Primary Examiner* — Allyson Trail
(74) *Attorney, Agent, or Firm* — Nong-Qiang Fan

(57) ABSTRACT

An apparatus includes (1) a first housing for housing therein a barcode reading arrangement and (2) an enclosed space for housing therein a battery configured to power the barcode reading arrangement located outside the enclosed space. The first housing includes a window made from one or more materials that has a lower flaming critical temperature than that of any material for making the enclosed space for housing the battery.

15 Claims, 4 Drawing Sheets

ID OF THE DISCLOSURE

METHOD AND APPARATUS FOR POWERING BARCODE READERS

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more solid-state imagers for reading and decoding barcodes are typically referred to as imaging-based barcode readers, imaging scanners, or imaging readers. A solid-state imager generally includes a plurality of photosensitive elements or pixels aligned in one or more arrays. Examples of solid-state imagers include charged coupled devices (CCD) or complementary metal oxide semiconductor (CMOS) imaging chips.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes.

In FIG. 1, many parts for making the imaging scanner 50 may need to satisfy certain flammability requirements. For example, the window 56 may be made from plastic materials, and if a battery is installed in the housing 58 directly with other components, the window 56 and these other components may need to satisfy the flammability requirements of the UL94 standard as defined by Underwriters Laboratories of the USA. The UL94 flammability requirements necessitate the use of plastics of certain kind and of a certain thickness in order for the imaging scanner 50 to pass the UL94 standard. Finding optically clear, elastomeric or sometimes flexible hard plastics with the correct flammability rating that also meet our other specifications (e.g., optical clarity, minimal out-gassing and blooming, or flexural modulus) can sometimes be problematic or many times impossible. The flammability additive can hurt optical clarity and cause significant out-gassing that will cloud optics and affect mechanical properties. Therefore, it is desirable to find a technique that can reduce the flammability requirements for certain components in the imaging scanner 50, such as, the flammability requirements for the window 56.

SUMMARY

In one aspect, the invention is directed to an apparatus. The apparatus includes (1) a first housing for housing therein a barcode reading arrangement and (2) an enclosed space for housing therein a battery configured to power the barcode reading arrangement located outside the enclosed space. The enclosed space is made from one or more V1-compliance materials. The barcode reading arrangement includes (1) a solid-state imager having an array of photosensitive elements for capturing an image from a target object having a barcode and (2) a lens system operative to focus light reflected from the target object onto the array of photosensitive elements in the solid-state imager.

In one aspect, the invention is directed to an apparatus. The apparatus includes (1) a first housing for housing therein a barcode reading arrangement and (2) an enclosed space for housing therein a battery configured to power the barcode reading arrangement located outside the enclosed space. The first housing includes a window made from one or more materials that has a lower flaming critical temperature than that of any material for making the enclosed space for housing the battery.

Implementations of the invention can include one or more of the following advantages. The flammability requirements for certain components in the imaging scanner 50 can be reduced. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
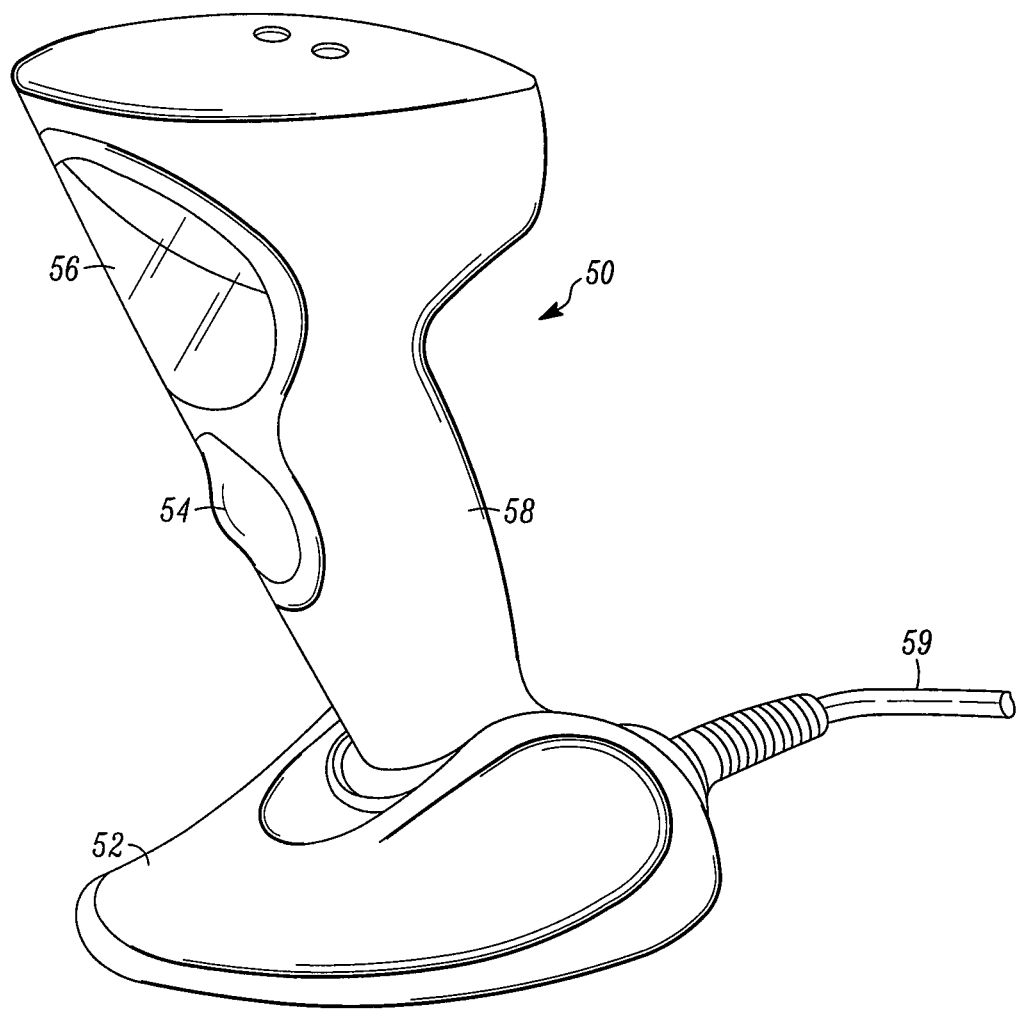
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
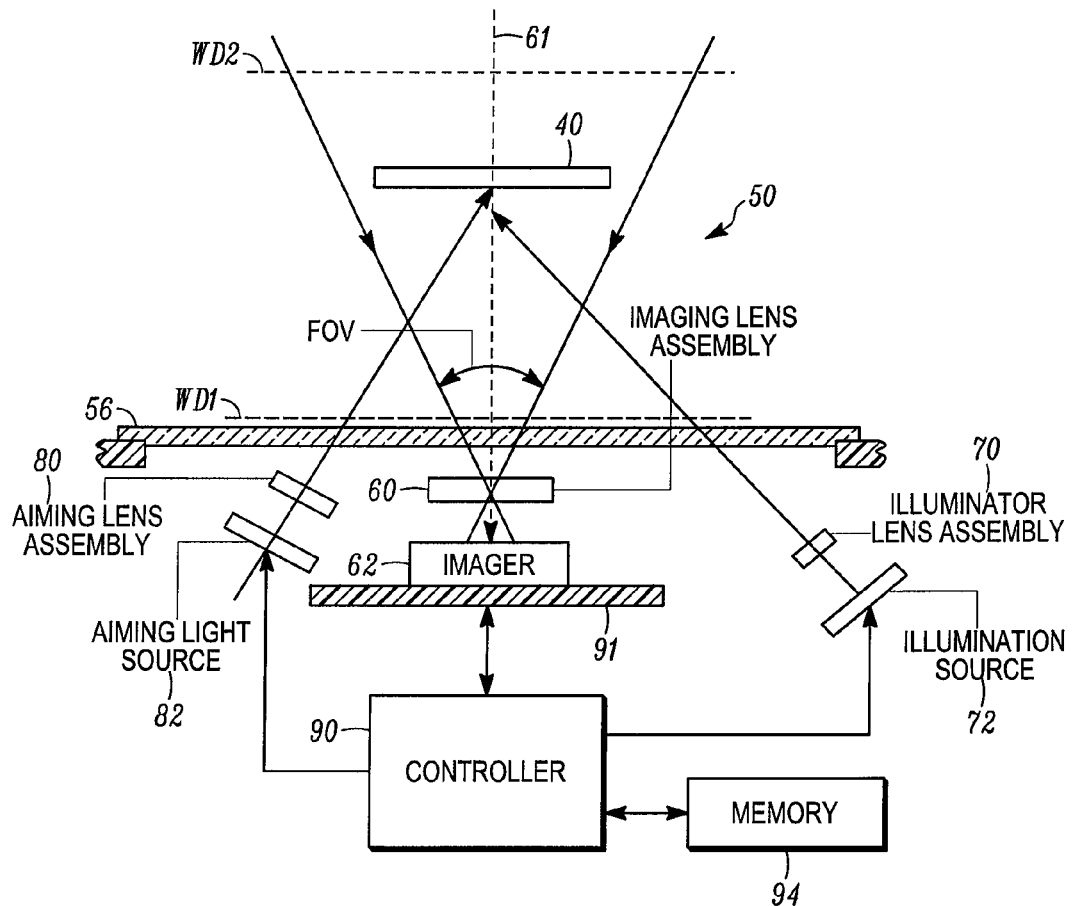
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) a solid-state imager 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The solid-state imager 62 is mounted on a printed circuit board 91 in the imaging scanner.

The solid-state imager 62 can be a CCD or a CMOS imaging device. The solid-state imager 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The solid-state imager 62 is operative to detect light captured by an imaging lens assembly 60 along an optical path or axis 61 through the window 56. Generally, the solid-state imager 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is about a few inches from the window 56, and WD2 is about a few feet from the window 56. Some of the imaging scanners can include a range finding system for measuring the distance between the barcode 40 and the imaging lens assembly 60. Some of the imaging scanners can include an auto-focus system to enable a barcode be more clearly imaged with the solid-state imager 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the solid-state imager 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser or other kind of light sources.

In FIG. 2, the controller 90, such as a microprocessor, is operatively connected to the solid-state imager 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the solid-state imager 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
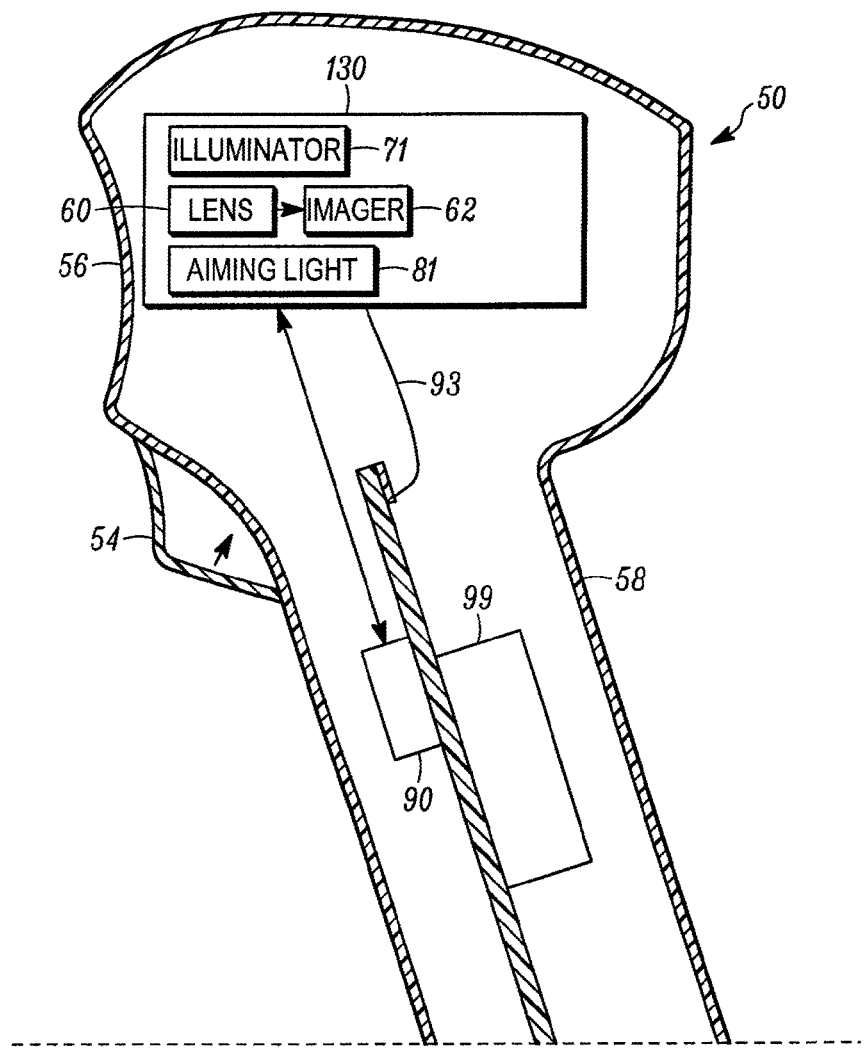
FIG. 3 depicts an imaging scanner in accordance with some existing implementations.

FIG. 3 depicts an imaging scanner 50 in accordance with some existing implementations. The imaging scanner 50 includes a housing 58, a window 56, a barcode reading arrangement 130, a controller 90, and a battery 99. The barcode reading arrangement 130 is located behind the window 56. The battery 99 located in the housing 58 is used to power the controller 90, the barcode reading arrangement 130 and other electrical components inside the housing 58. The barcode reading arrangement 130 is powered by the battery 99 through a power line 93. In FIG. 3, if the imaging scanner 50 has to satisfy the flammability requirements of the UL94, the materials for making many components in the imaging scanner 50 has to satisfy the UL94 requirements, which can greatly limit the choice of the materials that can be used. It is desirable to improve the imaging scanner 50 as shown in FIG. 3.

Figure 4:
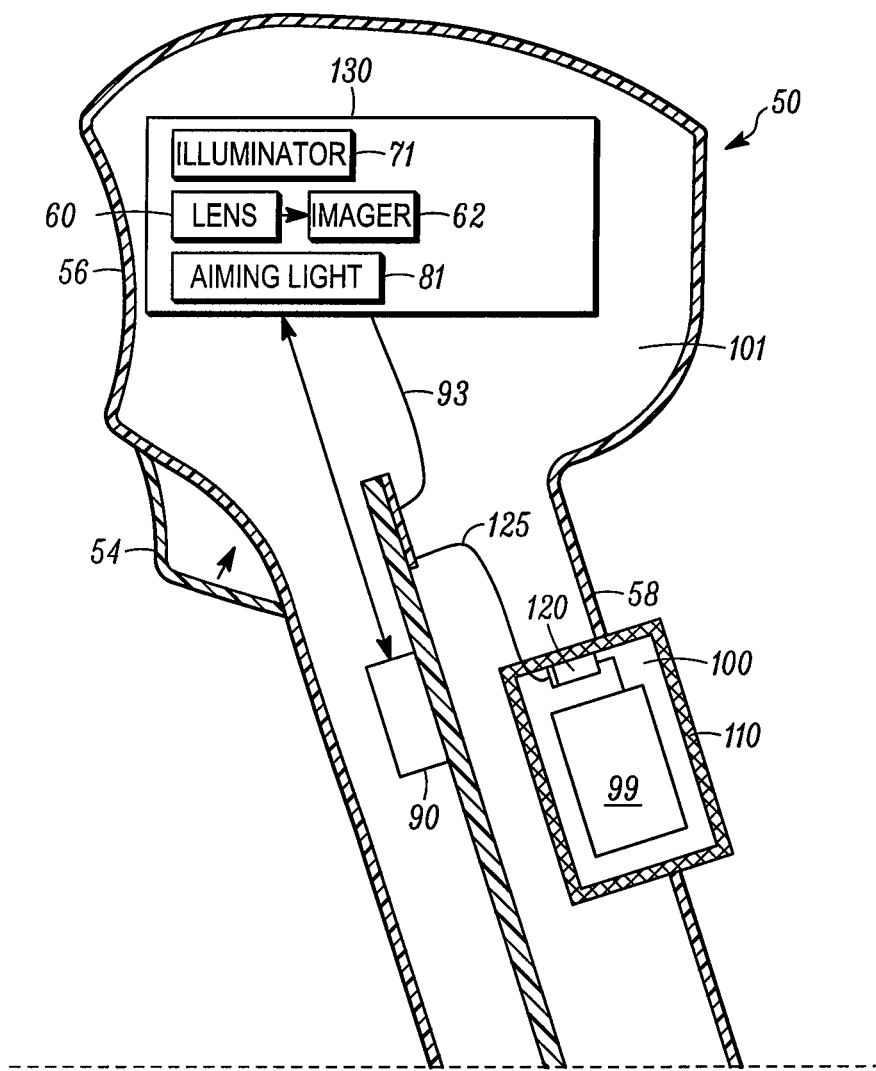
FIG. 4 depicts an improved imaging scanner that has a battery located inside an enclosed space in accordance with some embodiments.

FIG. 4 depicts an improved imaging scanner 50 that has a battery 99 located inside an enclosed space 100 in accordance with some embodiments. The imaging scanner 50 includes a first housing 101 for housing therein a barcode reading arrangement 130. The barcode reading arrangement 130 includes a solid-state imager 62 having an array of photosensitive elements for capturing an image from a target object having a barcode. The barcode reading arrangement 130 also includes a lens system 60 operative to focus light reflected from the target object onto the array of photosensitive elements in the solid-state imager 62. The barcode reading arrangement 130 can also include an illumination assembly 71, an aiming light assembly 81, or an electric circuitry operative to transfer the image captured by the solid-state imager to a barcode decoding circuitry (not shown in the figure).

In FIG. 4, the imaging scanner 50 includes an enclosed space 100 for housing therein a battery 99 configured to power the barcode reading arrangement 130 located outside the enclosed space 100. The enclosed space is made from one or more V1-compliance materials 110. The V1-compliance materials here are defined as those materials that satisfy the V1 flammability test procedure as specified in pp. 14-17 of "UL 94 Standard for Tests for Flammability of Plastic Materials for Parts in Devices and Appliances," Fifth Edition, published Oct. 29, 1996 (ISBN 0-7629-0082-2). Simply defined for the purpose of claim interpretation, a specimen of V1-compliance materials must satisfy the condition that the burning must stop within 30 seconds on a 3.2 thick vertical specimen with a size of 12.5 cm×1.3 cm, while the drips of particles are allowed as long as they are not inflamed.

In FIG. 4, the imaging scanner 50 includes a power wire 125 configured to provide a current to the barcode reading arrangement from the battery. There is also a fuse 120 configured to limit the current in the part of the power wire 125 located in the first housing 101. Because of this current limitation, the materials for making those components in the first housing 101 do not have to be V1-compliance materials. For example, the window 56 can be made from materials different from the one or more V1-compliance materials 110 for making the enclosed space 100. The first housing 101 can also include some rubber components or foam pads that are made from materials different from the one or more V1-compliance materials 110 for making the enclosed space 100. The embodiment of the imaging scanner 50 have the advantage that parts like the exit window, light-pipes, triggers, rubber bezels, and keypads are easier to make at least for the reason that adding flame retardant additive to these parts may no longer be necessary. Injection molded exit windows (e.g., the window 56) that would have diminished optical properties with flame retardant additive would no longer pose a problem. Also rubber bezels and other parts comprising the flame enclosure of the scanner housing would not need to have flame retardant additive that could outgas and cloud internal optics and windows. It also solves the problem that there may have been flexible trigger systems and keypads that are either not available with flame retardant additive or suffer from changed properties with the additive onboard.

In other embodiments, the window 56 can simply made from one or more materials that have a lower flaming critical temperature than that of any material for making the enclosed space 100 for housing the battery 99.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a first housing for housing therein a barcode reading arrangement that includes (1) a solid-state imager having an array of photosensitive elements for capturing an image from a target object having a barcode and (2) a lens system operative to focus light reflected from the target object onto the array of photosensitive elements in the solid-state imager;
   an enclosed space for housing therein a battery configured to power the barcode reading arrangement located outside the enclosed space, the enclosed space being made from one or more V1-compliance materials; and
   a fuse configured to limit the current outputted from the battery.

2. The apparatus of claim 1, further comprising:
a power wire configured to provide a current to the barcode reading arrangement from the battery; and
wherein the fuse configured to limit the current in the part of the power wire located in the first housing.

3. The apparatus of claim 1, wherein the first housing includes a window made from materials different from the one or more V1-compliance materials for making the enclosed space.

4. The apparatus of claim 1, wherein the first housing includes a rubber component made from materials different from the one or more V1-compliance materials for making the enclosed space.

5. The apparatus of claim 1, wherein the first housing includes a foam pad made from materials different from the one or more V1-compliance materials for making the enclosed space.

6. The apparatus of claim 1, wherein the barcode reading arrangement further includes an electric circuitry operative to transfer the image captured by the solid-state imager to a barcode decoding circuitry.

7. The apparatus of claim 1, further comprising:
a seal around an interface contact for a cradle to form a V1-compliance enclosure when the battery is charged by the cradle.

8. An apparatus comprising:
a first housing for housing therein a barcode reading arrangement that includes (1) a solid-state imager having an array of photosensitive elements for capturing an image from a target object having a barcode and (2) a lens system operative to focus light reflected from the target object onto the array of photosensitive elements in the solid-state imager;
an enclosed space for housing therein a battery configured to power the barcode reading arrangement located outside the enclosed space; and
wherein the first housing includes a window made from one or more materials that has a lower flaming critical temperature than that of any material for making the enclosed space for housing the battery;
a fuse configured to limit the current outputted from the battery.

9. The apparatus of claim 8, further comprising:
a power wire configured to provide a current to the barcode reading arrangement from the battery; and
wherein the fuse configured to limit the current in the part of the power wire located in the first housing.

10. The apparatus of claim 8, wherein the barcode reading arrangement further includes an electric circuitry operative to transfer the image captured by the solid-state imager to a barcode decoding circuitry.

11. The apparatus of claim 8, further comprising:
a seal around an interface contact for a cradle to form a V1-compliance enclosure when the battery is charged by the cradle.

12. A method comprising:
housing a barcode reading arrangement in a first housing, the barcode reading arrangement including (1) a solid-state imager having an array of photosensitive elements for capturing an image from a target object having a barcode and (2) a lens system operative to focus light reflected from the target object onto the array of photosensitive elements in the solid-state imager;
housing a battery in an enclosed space made from one or more V1-compliance materials;
powering the barcode reading arrangement located outside the enclosed space with the battery in the enclosed space; and
limiting the current outputted from the battery with a fuse.

13. The method of claim 12, further comprising:
powering the barcode reading arrangement with a power wire from the battery; and
limiting a current in the part of the power wire located in the first housing with the fuse.

14. A method comprising:
housing a barcode reading arrangement in a first housing, the barcode reading arrangement including (1) a solid-state imager having an array of photosensitive elements for capturing an image from a target object having a barcode and (2) a lens system operative to focus light reflected from the target object onto the array of photosensitive elements in the solid-state imager;
housing a battery in an enclosed space made from one or more materials each having a flaming critical temperature higher than that of the materials for making a window on the first housing; and
powering the barcode reading arrangement located outside the enclosed space with the battery in the enclosed space;
limiting the current outputted from the battery with a fuse.

15. The method of claim 14, further comprising:
powering the barcode reading arrangement with a power wire from the battery; and
limiting a current in the part of the power wire located in the first housing with the fuse.

* * * * *